INVENTOR.
Marion D. Smith
BY
Ronald L. Phillips
ATTORNEY

United States Patent Office
3,572,164
Patented Mar. 23, 1971

1

3,572,164
HYDROMECHANICAL TRANSMISSION
Marion D. Smith, Indianapolis, Ind., assignor to General
Motors Corporation, Detroit, Mich.
Filed Sept. 19, 1969, Ser. No. 859,349
Int. Cl. F16h 47/04
U.S. Cl. 74—687                     7 Claims

ABSTRACT OF THE DISCLOSURE

A hydromechanical transmission having a variable ratio hydrostatic drive unit, two planetary gear sets and a plurality of friction drive establishing devices with one such device arranged in a simple direction maintaining gear train and another such device arranged in a simple direction reversing gear train and all the components combined to provide at least three different speed range drives with each drive established by engagement of only one friction drive establishing device and each such device speed synchronized for its engagement at a predetermined transmission input-output speed ratio.

---

Figure 1:
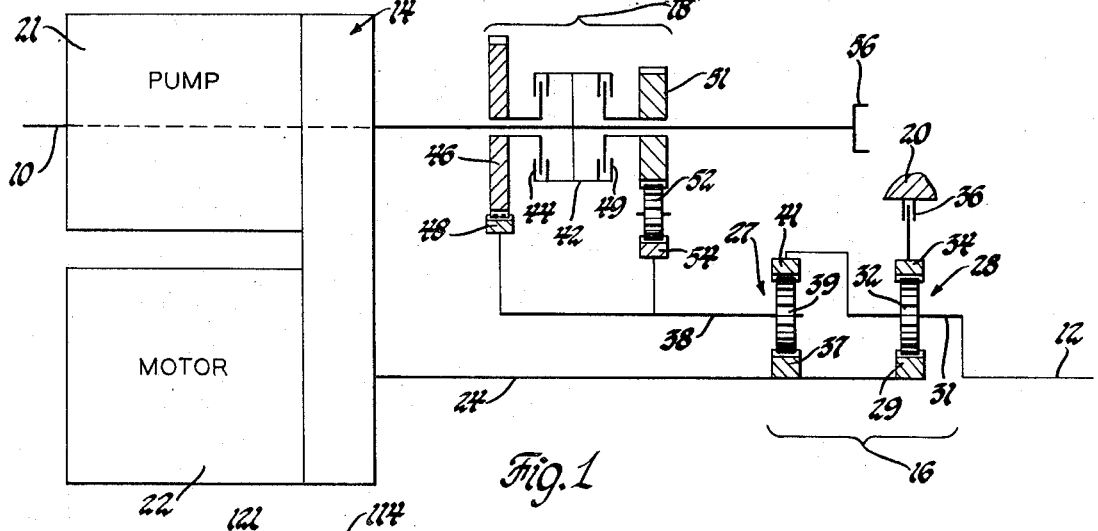

This invention relates to hydromechanical transmissions and more particularly to vehicular hydrostatic-mechanical transmissions providing a plurality of speed range drives.

In vehicular transmissions, a variable ratio hydrostatic drive unit offers the advantages of controlled, infinitely variable speed and torque ratios within limited ranges. It is also well known that these ranges can be extended by combining gearing generally of the planetary type with the hydrostatic drive unit and that further advantages can be obtained by employing a split power path, one path being hydraulic and the other being mechanical with efficiency resulting from the use of the mechanical power path. Furthermore, if more than one drive range is provided it is known that a shift between drives can be accomplished by a friction drive establishing device that is speed synchronized for engagement at a predetermined transmission input-output speed ratio. However, engineering problems arise in attempting to extend these ranges to a large degree with a speed synchronized shifting type hydromechanical transmission of minimum dimensional size since it is desirable to have a minimum number of planetary gear sets for the types and numbers of drives desired and without resorting to complex gearing.

The hydromechanical transmission according to the present invention does extend the ranges of the hydrostatic drive unit to a large degree using only two planetary gear sets and simple mechanical power path gear trains with each speed range drive established by engagement of a single drive establishing device which is speed synchronized at a predetermined transmission input-output speed ratio. In each of three embodiments according to the present invention, the transmission comprises a variable ratio hydrostatic drive unit having a pump and motor each with variable displacement. The pump is driven by the transmission input and the motor is connected to deliver power to two planetary gear sets. Each of the planetary gear sets comprises a sun gear, a ring gear and a carrier having a pinion meshing with the sun gear and ring gear. Both of the sun gears are driven by the motor, and the carrier of one gear set and the ring gear of the other gear set are connected to the transmission output. A friction drive establishing device controls the speed of the ring gear of the stated one gear set to establish one drive to the transmission output. A drive train including a second friction drive establishing device and gearing having only a drive gear and a driven gear is operable to selectively drivingly connect the transmission input to

2 drive the carrier of the stated other gear set in one direction to provide another drive to the transmission output. Another drive train including a third friction drive establishing device and gearing having only a drive gear, idler gear and a driven gear is operable to selectively drivingly connect the transmission input to drive the carrier of the stated other gear set in a direction opposite the first mentioned direction to provide another drive to the transmission output. This arrangement enables the gear sizes to be selected so that at a predetermined transmission input-output speed ratio, the friction drive establishing device to be engaged for a shift to the next speed range is speed synchronized.

An object of the present invention is to provide a new and improved hydromechanical transmission.

Another object is to provide a hydromechanical transmission having a variable ratio hydrostatic drive unit, two planetary gear sets and at least three friction drive establishing devices with two of these devices arranged in simple gear trains which provide selective drives of opposite direction to the planetary gearing and all of the components arranged to provide at least three different speed range drives with each such drive established on engagement of a single friction drive establishing device.

Another object is to provide a hydromechanical transmission having two planetary gear sets powered by a hydrostatic drive unit and simple gear trains which are connected in parallel with the hydrostatic drive unit and provide selective drives in either one of two directions to the planetary gearing so that the arrangement provides at least three different speed range drives with each drive established by engagement of a single friction drive establishing device which is speed synchronized at a predetermined transmission input-output speed ratio.

These and other objects of the present invention will be more apparent from the following description and drawing in which:

FIG. 1 diagrammatically shows one embodiment of the hydromechanical transmission according to the present invention.

Figure 2:
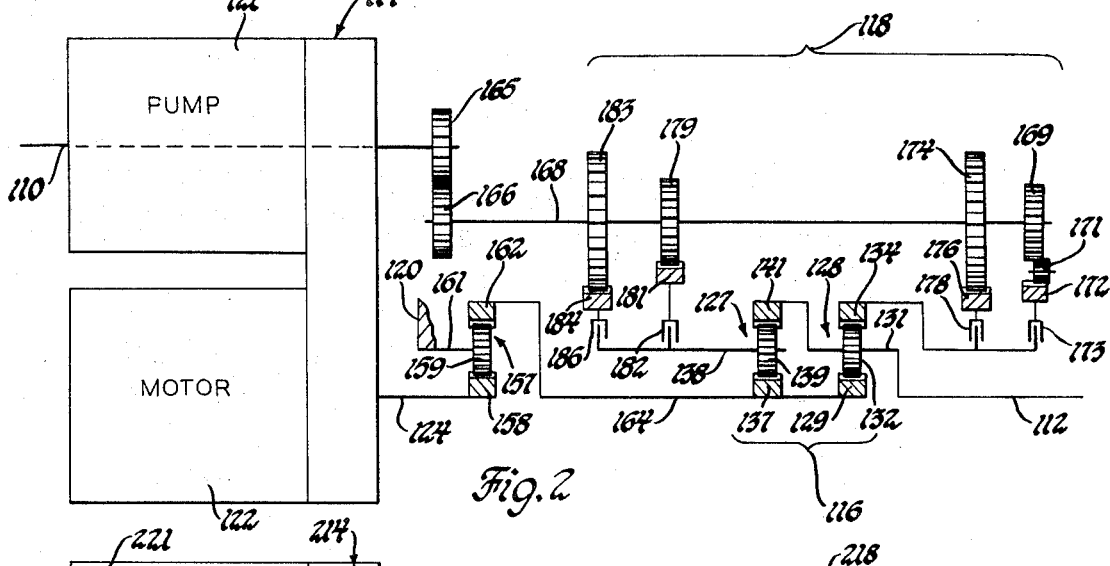

FIG. 2 diagrammatically shows another embodiment of the hydromechanical transmission according to the present invention.

Figure 3:
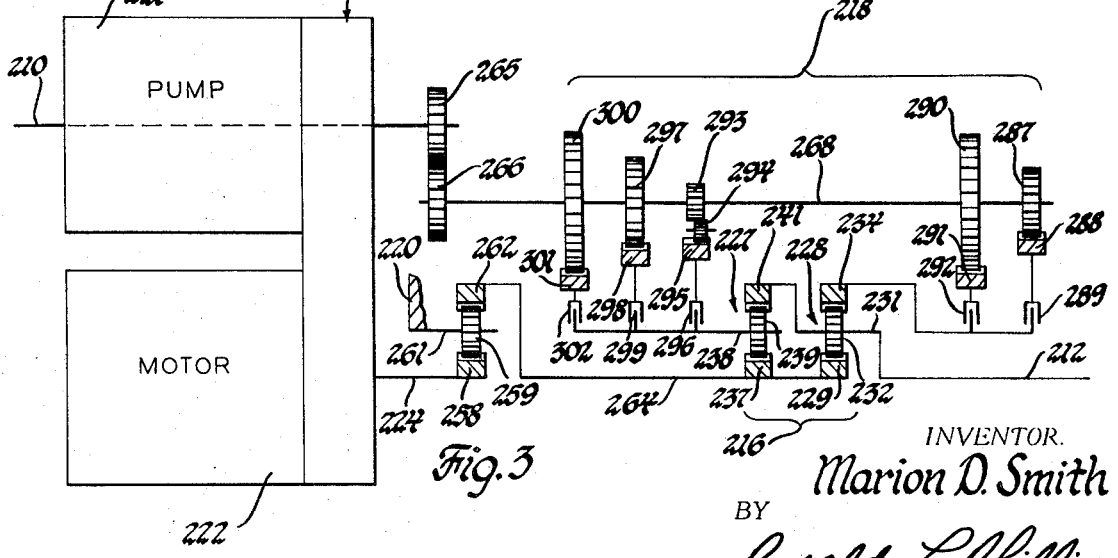

FIG. 3 diagrammatically shows a third embodiment of the hydromechanical transmission according to the present invention.

FIG. 1 TRANSMISSION ARRANGEMENT

Referring first to FIG. 1 of the drawing, there is shown a hydromechanical transmission generally comprising a transmission input shaft 10 operatively drivingly connected to a transmission output shaft 12 by a variable ratio hydrostatic drive unit 14, planetary gearing 16 and a gear train arrangement 18. All of the components are suitably supported in a transmission housing generally designated at 20 with the input shaft 10 adapted for connection to an engine and the output shaft 12 adapted for connection by a final drive train to the vehicle's driving wheels. The axes of the input shaft 10 and output shaft 12 are parallel and the other components are closely arranged relative to these shafts as described in more detail later to provide a compact transmission arrangement characterized by the short length.

Input power to the transmission is transmitted by the input shaft 10 which is connected to drive the pump 21 of hydrostatic drive unit 14. Motor 22 which is hydraulically driven by pump 21 is connected to drive a motor output shaft 24. The hydrostatic drive unit 14 may be of a conventional type with both the pump 21 and the motor 22 having variable displacement. Thus, with power to pump 21 and by controlling the hydrostatic drive unit's displacements, the motor 22 can be caused to drive the motor output shaft 24 from zero speed in a hydraulically locked condition to some maximum speed in either direction.

The planetary gearing 16 has only two planetary gear sets 27 and 28, each of these gear sets being of the simple type in that they each have a sun gear, a ring gear and a carrier having pinions meshing with the sun gear and ring gear. In gear set 28, the sun gear 29 is connected to motor output shaft 24 and the carrier 31 carrying pinions 32 is connected to transmission output shaft 12. The ring gear 34 may be braked by engagement of a brake 36, the brake 36 thus controlling the speed of ring gear 34 in that it selectively permits the ring gear to run free or holds the ring gear at zero speed.

In gear set 27, the sun gear 37 is connected to motor output shaft 24 like the other sun gear 29. The carrier 38 which carries the pinions 39 may be driven by the transmission input shaft 10 through either one of two mechanical drives provided by gear train arrangement 18 as described in more detail later. The ring gear 41 is connected to carrier 31 of the other gear set 28 and is thus connected to transmission output shaft 12.

That portion of the transmission input power which is transmitted to carrier 38 of gear set 27 is all mechanical and is taken from the transmission input shaft 10 which extends through the pump 21 to gear train arrangement 18 as shown. In gear train ararngement 18 the transmission input shaft 10 is connected to a drum 42. The input driven drum 42 may be connected by engagement of a clutch 44 to a drive gear 46 which is otherwise mounted to rotate freely relative to transmission input shaft 10. Drive gear 46 meshes with a driven gear 48 which is connected to carrier 38 of gear set 27. Thus when clutch 44 is engaged, the carrier 38 is driven by transmission input shaft 10 at a speed determined by the gear ratio of gears 46 and 48 and in a direction opposite that of the transmission input shaft. Alternatively, the input driven drum 42 may be connected by engagement of a clutch 49 to a drive gear 51 which is otherwise free to rotate relative to the transmission input shaft 10. Drive gear 51 meshes with an idler gear 52 and this idler gear meshes with a driven gear 54 which is connected to carrier 38 of gear set 27. Thus when clutch 49 is engaged, the carrier 38 is driven by the transmission input shaft 10 at a speed determined by the gear ratio of gears 51 and 54 and in the same direction as the transmission input shaft because of the interposition of idler gear 52. In the gear train arrangement 18 the two drive gears 46 and 51 and the two clutches 44 and 49 are all arranged about the transmission input shaft 10 and the two driven gears 48 and 54 are both arranged about the motor output shaft 24 with the result that there is provided an overall short transmission length. A flange 56 is connected to the right-hand end of transmission input shaft 10 to provide for connecting the transmission input and thus the engine to drive auxiliary vehicle equipment.

The brake and clutches or frictional drive establishing devices are conventional and together with the hydrostatic drive unit may be operated in any known way, e.g. electrically, hydraulically, pneumatically, or by some mechanical provision and according to a certain schedule.

FIG. 1 TRANSMISSION OPERATION

The hydromechanical transmission shown in FIG. 1 may be operated to provide two speed range drives in forward and reverse wherein the speed ratio between transmission input and transmission output in each drive is infinitely variable by the variable speed ratio drive of the hydrostatic drive unit 14.

Neutral is provided by disengaging or releasing all of the drive establishing devices and conditioning the hydrostatic drive unit 14 so that motor output shaft 24 is at zero speed. This disconnects all power paths between the transmission input and output.

The first and lowest speed range forward drive is established by engaging only brake 36 to hold ring gear 34 of gear set 28. With power to the transmission input shaft 10 and on conditioning of hydrostatic drive unit 14 to provide hydrostatic drive to motor output shaft 24, the sun gear 29 of gear set 28 is driven in what will be called the forward direction which in this arrangement is opposite that of the transmission input shaft. With sun gear 29 this driven and ring gear 34 thus held, carrier 31 and connected transmission output shaft 12 are driven in the same direction which is the forward direction at a reduced speed by the full hydrostatic drive. Gear set 28 thus acts as a torque multiplier-speed reducer in this low speed range drive and transmission output speed is increased by increasing the output speed of motor 22. For ease in understanding it will be assumed throughout the description of operation that transmission input speed remains constant.

In the low speed range forward drive, sun gear 37 in gear set 27 is being driven in the forward direction by motor 22 while ring gear 41 of this gear set is being driven in the same direction by the carrier output from gear set 28. Sun gear 37 and ring 41 cooperate to provide drive in the same direction to carrier 38 with their speed components being additive in this drive. The carrier 38 in turn drives the driven member of clutch 44 through the gear train comprising gears 46 and 48. Since there is reversal of drive direction in this gear train, the driven member is driven in the same direction as the drive member of clutch 44 which is being driven by the transmission input shaft 10. This arrangement enables the sizes of these operating gears to be selected so that at a predetermined transmission input-output sped ratio or motor speed since input speed has been assumed to be constant, the driven clutch member rotates at the same speed and in the same direction as the drive clutch member of clutch 44. This predetermined transmission input-output speed ratio may occur at maximum motor output speed to obtain full benefit of the hydrostatic drive unit's speed ratio range and for both illustrating the full useful transmission coverage and ease in understanding, bearing in mind the transmission input speed has been assumed to be constant, this condition of speed synchronization will be described as occurring at maximum motor output speed throughout the description of operation.

An upshift from the low speed range forward drive to a high speed range forward drive is preferably accomplished when the above speed synchronized condition of clutch 44 is reached. The clutch 44 is then engaged and then the brake 36 is released. With clutch 44 engaged, mechanical drive is then transmitted from transmission input shaft 10 by gears 46 and 48 to carrier 38 of gear set 27 to drive this carrier in the forward direction. With carrier 38 thus mechanically driven in the forward direction, the forward speed component of the hydrostatically driven sun gear 37 in gear set 27 subtracts from that of carrier 38 in the drive they cooperatively provide to drive ring gear 41 and connected transmission output shaft 12 in the forward direction. Thus the speed of ring gear 41 and connected transmission output shaft 12 increases with decreasing speed of the forwardly rotating sun gear 37 until the latter gear reaches zero speed. Then when sun gear 37 is driven in the opposite or reverse direction by motor 22, its reverse speed component adds to the forward speed component of carrier 38 so that the speed of ring gear 41 and connected transmission output shaft 12 increases with increasing speed of sun gear 37 in the reverse direction. Thus in the high speed range forward drive, the hydrostatic drive unit 14 is operated to decrease the speed of the forwardly rotating sun gear 37 from maximum forward motor output speed to zero and then to reverse the direction of sun gear 37 and increase its speed in the reverse direction to continuously increase the speed of transmission output shaft 12. Thus maximum transmission output speed in this range occurs at maximum reverse motor output speed. Downshifting from high to the low speed range forward drive is also provided with a speed synchronized condition at brake 36 by the drive to ring gear 34 provided by carrier 31 and sun gear 29 in the high speed range forward drive which conditions ring gear 34 and thus the rotatable member of the brake 36 at zero speed at maximum forward motor output speed in the high speed range forward drive.

The first and lowest speed range reverse drive is established by engaging only brake 36 like in the low speed range forward drive. However for low speed range reverse drive, the hydrostatic drive unit 14 is operated to drive motor output shaft 24 and connected sun gear 29 in the reverse direction to thus drive transmission output shaft 12 in the reverse direction. Thus this drive is like that in the first speed range forward drive except that motor 22 is driven in the reverse direction.

In the low speed range reverse drive the carrier 38 of gear set 27 is driven in the reverse direction by the additive speed components of sun gear 37 and ring gear 41 which are both rotating in the reverse direction. The carrier 38 in turn drives the driven member of clutch 49 through gears 54, 52 and 51 in the same direction as the drive member of this clutch which is being driven by the transmission input shaft 10. This arrangement enables the sizes of these operating gears to be selected so that at the maximum reverse motor output speed, the driven member of clutch 49 is rotating in the same direction and at the same speed as the drive member of this clutch.

A shift from the low speed range reverse drive to a high speed range reverse drive is preferably accomplished when the above speed synchronized condition of clutch 49 is reached. The clutch 49 is then engaged and then the brake 36 is released. With the clutch 49 engaged, mechanical drive is then provided from transmission input shaft 10 through gears 51, 52 and 54 to carrier 38 of gear set 27. Thus carrier 38 is now mechanically driven in the reverse direction which is the same direction that motor 22 is driving sun gear 37. The speed component of sun gear 37 thus subtracts from that of carrier 38 in the reverse drive they cooperatively provide to ring gear 41 and connected transmission output shaft 12. Accordingly, the speed of transmission output shaft 12 in the reverse direction increases with decreasing reverse speed of sun gear 37 until the latter gear reaches zero speed. Then when sun gear 37 is rotated in the forward direction, its speed component adds to that of carrier 38 and thus the speed of ring gear 41 so that the speed of transmission output shaft 12 then increases with increasing speed of sun gear 37 in the forward direction. Thus, in the high speed range reverse drive, the hydrostatic drive unit 14 is operated to decrease the output speed of motor 22 from its maximum output speed in the reverse direction to zero speed and then to increase its speed to maximum speed in the forward direction to continuously increase the speed of transmission output shaft 12 in the reverse direction. The gear train provided by gears 51, 52 and 54 provides the same speed reduction and torque multiplication as that of the other gear train to carrier 38 provided by gears 46 and 48. Thus the high speed range reverse drive provides the same speed reduction and torque multiplication as the high speed range forward drive. Downshifting from high to the low speed range reverse drive is also provided with a speed synchronized condition at brake 36 by the drive to ring gear 34 provided by sun gear 29 and carrier 31 of gear set 28, this condition in which ring gear 34 is at zero speed occurring at maximum reverse motor output speed in the high speed range reverse drive.

The FIG. 1 embodiment of the hydromechanical transmission thus provides the same torque multiplication and speed ratio coverage in forward and reverse which is particularly suitable for use in a working type vehicle. Where it is desirable to have more torque multiplication and speed ratio coverage in forward drive and smaller coverage in reverse drive such as for use in hauling type vehicles, the FIGS. 2 and 3 embodiments of the hydromechanical transmission according to the present invention may be employed.

FIGURE 2 TRANSMISSION ARRANGEMENT

Referring to FIG. 2, the transmission input shaft 110 is connected to drive pump 121 of the hydrostatic drive unit 114 and motor 122 is connected to drive motor output shaft 124. Further torque multiplication and speed reduction in the hydrostatic power path is provided by continuously drivingly connecting motor output shaft 124 to sun gears 129 and 137 of the planetary gearing 116 by a torque multiplication-speed reduction gear train 157 having a gear 158 connected to motor output shaft 124. Gear 158 meshes with a plurality of pinions 159 journaled on spindles 161 which are fixed to transmission housing 120. The pinions 159 mesh with the internal teeth of an annular gear 162 which is connected to sun gears 129 and 137 by an intermediate shaft 164. Sun gears 129 and 137 are thus driven at a reduced speed relative to motor output shaft 124 and in the opposite direction.

In planetary gear set 128, the sun gear 129 meshes with pinions 132 carried by carrier 131, the carrier being connected to transmission output shaft 112. Ring gear 134 of this gear set may be mechanically driven by transmission input shaft 110 through either one of two drive trains in gear train arrangement 118.

For mechanical power delivery to gear set 128 and also the other planetary gear set 127, the transmission input shaft 110 extends through pump 121 and is connected at its right-hand end to a drive gear 165 which meshes with a driven gear 166. Driven gear 166 is connected to a countershaft 168 extending parallel to and intermediate the axis of shaft 110 and the aligned axes of shafts 124, 164 and 112. One drive train to ring gear 134 of gear set 128 comprises a drive gear 169 which is connected to the right-hand end of countershaft 168 and meshes with an idler gear 171. Idler gear 171 meshes with a driven gear 172 which may be connected by engagement of a clutch 173 to ring gear 134. Thus with clutch 173 engaged, the ring gear 134 of gear set 128 is driven in a direction opposite that of transmission input shaft 110. Alternatively, the ring gear 134 may be driven by the transmission input shaft 110 through the drive train comprising a drive gear 174 which is connected to countershaft 168 and meshes with a driven gear 176. The driven gear 176 may be connected to ring gear 134 by engagement of a clutch 178 and with this drive train arrangement, the ring gear 134 is driven in the same direction as transmission input shaft 110. The gear train provided by gears 169, 171 and 172 provides more speed reduction and more torque multiplication than the gear train provided by gears 174 and 176 for reasons which will become more apparent in the description of operation.

In planetary gear set 127, the sun gear 137 meshes with pinions 139 carried by carrier 138 which may be driven through either one of two mechanical power paths from the transmission input shaft 110. Pinions 139 mesh with ring gear 141 which is connected to carrier 131 of gear set 128 and is thus connected to transmission output shaft 112. One of the mechanical drives to carrier 138 is provided by the drive train comprising a drive gear 179 which is connected to countershaft 168. Drive gear 179 meshes with a driven gear 181 which is connected to carrier 138 by engagement of a clutch 182 to drive carrier 138 in the same direction as the transmission input shaft 110. Alternatively, the carrier 138 may be mechanically driven by the drive train comprising a drive gear 183 which is connected to countershaft 168 and meshes with a driven gear 184. Driven gear 184 may be connected by engagement of a clutch 186 to carrier 138 whereby the carrier is driven in the same direction as transmission input shaft 110. The gear train provided by gears 179 and 181 provides more speed reduction and more torque multiplication than the gear train provided by gears 183 and 184 for reasons which will become more apparent in the description of operation. In gear train arrangement 118 the clutches 182 and 186 are arranged about intermediate shaft 164 and the remaining two clutches 173 and 178 are arranged about transmission output shaft 112 with the result that compactness is maintained.

FIG. 2 TRANSMISSION OPERATION

The FIG. 2 transmission arrangement may be operated to provide four speed range drives wherein the speed ratio between input and output in each drive is infinitely variable by the variable speed ratio drive of the hydrostatic drive unit 114.

Neutral is provided by disengaging or releasing all of the drive establishing devices. This disconnects all power paths between the transmission input and output.

The lowest speed range forward drive is established by engaging clutch 182 whereby carrier 138 of gear set 127 is driven at a reduced speed relative to the transmission input shaft 110 and in the same direction which is the forward direction in this transmission arrangement. At the same time or beforehand, the hydrostatic drive unit 114 is operated to power the motor output shaft 124 in the reverse direction to drive sun gear 137 of gear set 127 in the forward direction which sun gear direction is thus the same direction as carrier 138. Since sun gear 137 is rotating in the same direction as carrier 138, its speed component substracts from that of carrier 138 in the driven they cooperatively provide to ring gear 141 and connected transmission output shaft 112. Thus, to obtain zero output speed in this speed range drive of the transmission, the reverse motor output speed is set at a value so that the forward speed component of sun gear 137 exactly offsets the forward speed component of carrier 138 so that the net effect of the drives of carrier 138 and sun gear 137 provides a zero speed component to transmission output shaft 112. To increase transmission output speed from zero in the forward direction, the hydrostatic drive unit 114 is operated to decrease the forward speed of sun gear 137 and thereby reduce its subtractive speed component. When the speed of sun gear 137 reaches zero, the speed of transmission shaft 112 is thereafter increased by increasing the speed of sun gear 137 in the reverse direction until maximum forward motor output speed is reached. In the high end of the low speed range forward drive when sun gear 137 is being driven in the reverse direction, the other sun gear 129 is also being driven in the same direction and at the same speed while carrier 131 is being driven in the forward direction by ring gear 141. Sun gear 129 and carrier 131 cooperatively produce a drive in the forward direction to ring gear 134 so that it and the connected driven member of clutch 178 are driven in the same direction as the forwardly rotating drive member of this clutch. This arrangement enables the sizes of these operating gears to be selected so that at maximum forward motor output speed, the drive member and driven member of clutch 178 are rotating in the same direction and at the same speed.

A shift from the low speed range forward drive to a higher and intermediate speed range forward drive is preferably accomplished when the above speed synchronized condition of clutch 178 is reached. The clutch 178 is then engaged and then the clutch 182 is released. With clutch 178 engaged, mechanical drive is then transmitted from transmission input shaft 110 by gears 174 and 176 to ring gear 134 to drive this ring gear in the forward direction. With sun gear 129 rotating in the reverse direction, its speed component subtracts from that of ring gear 134 in the drive they cooperatively provide to carrier 131 and thus to transmission output shaft 112. Thus in this higher speed range forward drive, the hydrostatic drive unit 114 is operated to first decrease the speed of sun gear 129 in the reverse direction to zero speed and then increase its speed in the forward direction to maximum speed to continuously increase transmission output speed in the forward direction. Downshifting from the intermediate to the low speed range forward drive is also provided with a speed synchronized condition at clutch 182 by the drives to ring gear 141 and sun gear 137 and thus to carrier 138 in the intermediate speed range forward drive. This speed synchronizes clutch 182 at maximum forward motor output speed in the intermediate speed range forward drive.

In the last half of the intermediate speed range forward drive, both the sun gear 137 and ring gear 141 are being driven in the forward direction and these gears cooperate to drive carrier 138 in the same direction. The carrier 138 thus drives the driven member of clutch 186 in the same direction that the drive member of this clutch is being driven by the transmission input shaft 110 through gears 183 and 184. This arrangement enables the sizes of these operating gears to be selected so that the driven member is rotating in the same direction and at the same speed as the drive clutch member of clutch 186 at maximum reverse motor output speed.

The shift from intermediate to a higher speed range forward drive which is the highest speed range drive in this arrangement is preferably accomplished when the above speed synchronized condition of clutch 186 is reached. The clutch 186 is then engaged and then the clutch 178 is released. Mechanical drive is then delivered from transmission input shaft 110 through gears 183 and 184 to drive carrier 138 in the forward direction. Since sun gear 137 is being driven in the forward direction its forward speed component subtracts from that of carrier 138 in the drive they cooperatively provide to drive ring gear 141 and thus transmission output shaft 112 in the forward direction. Thus in the high speed range forward drive, the hydrostatic drive unit 114 is operated to decrease the forward speed of sun gear 137 to zero and then increase this sun gear's speed in the reverse direction to maximum speed to continuously increase the forward speed of transmission output shaft 112. Downshifting from high to the intermediate speed range forward drive is also provided with a speed synchronized condition at clutch 178 by sun gear 129 and carrier 131 which cooperate to drive the driven member of clutch 178 at the same speed and in the same direction as the drive member of this clutch at maximum reverse motor output speed in the high speed range forward drive.

The lowest reverse speed range drive is established by conditioning the transmission in the same manner as was done for the low speed range forward drive, i.e. by engagement of only clutch 182. With the hydrostatic drive unit 114 conditioned to establish zero transmission output speed as discussed previously in the low speed range forward drive, transmission output reversal is obtained by operating the hydrostatic drive unit 114 to increase the speed of sun gear 137 in the forward direction. This increases the subtractive speed component of sun gear 137 and recalling that carrier 138 has a forward speed component, the net effect of this sun gear drive and carrier drive is that they cooperatively provide a drive in the reverse direction to ring gear 141 and thus to transmission output shaft 112. Maximum reverse speed in the low speed range reverse drive is obtained when sun gear 137 is rotating at its fastest forward speed corresponding to maximum reverse motor output speed.

As motor speed approaches maximum reverse speed in the low speed range reverse drive, the forward speed component of sun gear 129 and the forward speed component of carrier 131 drive ring gear 134 and the connected driven member of clutch 173 in the reverse direction which is the same direction that the drive member of this clutch is being driven by the transmission input shaft 110 through gears 169, 171 and 172. This arrangement enables the sizes of these operating gears to be selected so that at the maximum reverse motor output speed, the clutch members of clutch 173 are speed synchronized.

A shift from the low speed range reverse drive to a high speed range reverse drive is preferably accomplished when the above speed synchronized condition of clutch 173 is reached. The clutch 173 is then engaged and then the clutch 182 is released. With clutch 173 engaged, mechanical drive is then provided from transmission input shaft 110 to ring gear 134 of gear set 128. Since ring gear 134 is being driven in the reverse direction and sun gear 129 is being driven in the forward direction, the latter gear provides a subtractive speed component. Thus to increase the reverse speed of the transmission output shaft 112 in this higher speed range reverse drive, the hydrostatic drive unit 114 is operated to decrease the reverse motor output speed to zero and then increase motor output speed in the forward direction to continuously increase the reverse speed of transmission output shaft 112. Downshifting in reverse is also provided with a speed synchronized condition at clutch 182 by the drive to carrier 138 from ring gear 141 and sun gear 137, this condition occurring at maximum reverse motor output speed in the high speed range reverse drive.

FIGURE 3 TRANSMISSION ARRANGEMENT

Another extended version of the transmission according to the present invention is shown in FIG. 3. The transmission input shaft 210 is connected to drive pump 221 of the hydrostatic drive unit 214 whose motor 222 is connected to drive the motor output shaft 224. Like in FIG. 2, the FIG. 3 arrangement has a torque multiplication-speed reduction gear train having a gear 258 driven by motor output shaft 224 and in mesh with pinions 259 whose spindles 261 are fixed to the transmission housing 220. The pinions 259 mesh with the internal teeth of an annular gear 262 which is connected to the sun gears 229 and 237 of planetary gearing 216 by intermediate shaft 264.

In gear set 228, sun gear 229 meshes with pinions 232 carried by carrier 231 which is connected to transmission output shaft 212. Pinions 232 mesh with ring gear 234 which may be driven by transmission input shaft 210 through either one of two mechanical power paths in gear train arrangement 218. For the mechanical drives, the input shaft 210 extends through pump 221 and is connected at its right-hand end to a drive gear 265 which meshes with a driven gear 266. Driven gear 266 is connected to the left-hand end of a countershaft 268 which is arranged like in FIG. 2. A drive gear 287 connected to the right-hand end of countershaft 268 meshes with a driven gear 288 which may be connected by engagement of a clutch 289 to ring gear 234 of gear set 228. The other mechanical drive to ring gear 234 is provided by a drive gear 290 which is connected to countershaft 268 and meshes with a driven gear 291 that is connected by engagement of a clutch 292 to ring gear 234. The gear train provided by gears 287 and 288 provides more speed reduction and more torque multiplication than the gear train provided by gears 290 and 291 for reasons which will become more apparent in the description of operation.

In the other gear set 227, sun gear 237 meshes with pinions 239 carried by carrier 238. Pinions 239 mesh with ring gear 241 which is connected to carrier 231 and is thus connected to transmission output shaft 212. Three selective mechanical drives are provided to carrier 238 from transmission input shaft 210 in the gear train arrangement 218. One of these drives is provided by a drive gear 293 which is connected to countershaft 268 and meshes with an idler gear 294. Idler gear 294 meshes with a driven gear 295 which is connected by engagement of a clutch 296 to carrier 238. Another of these mechanical drives is provided by a drive gear 297 which is connected to countershaft 268 and meshes with a driven gear 298. Driven gear 298 is connected by engagement of clutch 299 to carrier 238. The third mechanical drive is provided by a drive gear 300 which is connected to countershaft 268 and meshes with a driven gear 301. Driven gear 301 is connected to carrier 238 by engagement of a clutch 302. The gear train provided by gears 293, 294 and 295 provides more speed reduction and more torque multiplication than the gear train provided by gears 297 and 298 and the latter gear train provides more speed reduction and more torque multiplication than the gear train provided by gears 300 and 301 for reasons which will become more apparent in the description of operation. In the gear train arrangement 218 the three clutches 296, 299 and 302 are arranged about intermediate shaft 264 and the remaining two clutches 289 and 292 are arranged about transmission output shaft 212 with the result that compactness is maintained.

FIG. 3 TRANSMISSION OPERATION

The FIG. 3 transmission arrangement may be operated to provide five speed range drives wherein the speed ratio between input and output in each drive is infinitely variable by the variable speed ratio drive of the hydrostatic drive unit 214.

Neutral is provided by disengaging or releasing all of the drive establishing devices. This disconnects all power paths to the transmission output sahft 212.

The lowest speed range forward drive is established by engaging only clutch 296 to mechanically drivingly connect transmission input shaft 210 to carrier 238 of gear set 227. This drives carrier 238 in what is the reverse direction in this arrangement. To obtain zero transmission output speed the hydrostatic drive unit 214 is conditioned to provide forward motor speed drive to drive sun gear 237 in the reverse direction at a speed which exactly offsets the reverse speed component of carrier 238 with the net effect that ring gear 241 and connected transmission output shaft 212 do not rotate. Forward drive is obtained by operating hydrostatic drive unit 214 to increase the reverse speed of sun gear 237 with the reverse speed component of carrier 238 substracting from the speed of the forward drive they then cooperatively provide to ring gear 241 and connected transmission output shaft 212. Thus, transmission output shaft 212 is caused to be driven in the forward direction and at a speed which increases with increasing reverse speed of sun gear 237 until maximum forward motor output speed is reached. Alternatively, when sun gear 237 is rotating at that reverse speed which conditions the transmission output shaft 212 at zero speed and the hydrostatic driven unit 214 is then operated to decrease this reverse sun gear speed, the transmission output shaft 212 is caused to rotate in reverse and increases in speed in this direction as sun gear 237 reduces in speed to zero in the reverse speed range drive thus provided. Further increase in transmission output speed in this reverse speed range drive is effected by then operating the hydrostatic drive unit 214 to drive sun gear 237 in the forward direction and increasing its speed to its highest value which occurs at maximum reverse motor output speed.

In the low speed range forward drive, sun gear 229 is being driven in the reverse direction and carrier 231 is being driven in the forward direction. Sun gear 229 and carrier 231 cooperativeliy provide a drive in the forward direction to ring gear 234 and the connected driven member of clutch 289 whose drive member is being driven in the forward direction by the transmission input shaft 210 through gears 287 and 288. This arrangement enables the sizes of the operating gears to be selected so that at maximum forward motor output speed, the clutch members of clutch 289 are speed synchronized.

A shift from the low speed range forward drive to a higher speed range drive which is the second forward speed range is preferably accomplished when the above speed synchronized condition of clutch 289 is reached. The clutch 289 is then engaged and then the clutch 296 is released. With clutch 289 engaged, mechanical drive is then transmitted from transmission input shaft 210 to ring gear 234 to drive this ring gear in the forward direction. With ring gear 234 rotating in the forward direction and sun gear 229 rotating in the reverse direction, the speed component of sun gear 229 subtracts from that of ring gear 234 in the forward drive they cooperatively provide to carrier 231. Thus, transmission output speed is increased in the second speed range drive by operating the hydrostatic drive unit 214 to decrease the reverse speed of sun gear 229 to zero and then increase its speed in the forward direction to maximum speed to continuously increase transmission output speed. Down-shifting from the second speed range forward drive to the first speed range forward drive is also provided with a speed synchronized condition at clutch 296 by the drive to carrier 238 from sun gear 237 and ring gear 241, this condition occurring at maximum forward motor output speed in the second speed range forward drive.

In the last half of the second speed range forward drive, both the sun gear 237 and ring gear 241 are rotating in the forward direction. Sun gear 237 and ring gear 241 cooperate to drive the driven member of clutch 299 in the forward direction which is the same direction that the drive member of this clutch is being driven by transmission input shaft 210 through gears 297 and 298. This arrangement enables the sizes of the operating gears to be selected so that at maximum reverse motor output speed there is no relative speed between the members of clutch 299 and thus this clutch is speed synchronized.

The shift from second to a third speed range forward drive is preferably accomplished when the above speed synchronized condition of clutch 299 is reached. The clutch 299 is then engaged and then the clutch 289 is released. With clutch 299 engaged, mechanical drive is then transmitted from the transmission input shaft 210 to drive carrier 238 in the forward direction. With sun gear 237 rotating in the forward direction, its speed component subtracts from that of carrier 238 in the drive to ring gear 241 and connected transmission output shaft 212. Thus, in the third speed range forward drive the hydrostatic drive unit 214 is operated to decrease the forward speed of sun gear 237 to zero and then increase its speed to the maximum value in the reverse direction to continuousliy increase transmission output speed. Downshifting from third to the second speed range forward drive is also provided with a speed synchronized condition at clutch 289 by sun gear 229 and carrier 231 which drive ring gear 234 in the forward direction, this condition occurring at maximum reverse motor output speed in the third speed range forward drive.

In the last half of the third speed range forward drive, sun gear 229 is rotating in the reverse direction and carrier 231 is rotating in the forward direction. Sun gear 229 and carrier 231 cooperate to drive ring gear 234 and the connected driven member of clutch 292 in the forward direction which is the same direction that the drive member of this clutch is being driven by transmission input shaft 210 through gears 290 and 291. This arrangement enables the sizes of the operating gears to be selected so that at maximum forward motor output speed in the third speed range forward drive, the members of clutch 292 are speed synchronized.

A shift from third to a fourth speed range forward drive is preferably accomplished when the above speed synchronized condition of clutch 292 is reached. The clutch 292 is then engaged and then the clutch 299 is released. Mechanical drive is then delivered from transmission input shaft 210 to drive ring gear 234 in the forward direction. Since sun gear 229 is being driven in the reverse direction and thus opposite that of ring gear 234, the speed component of sun gear 229 subtracts from that of ring gear 234 in the forward drive they provide to carrier 231 and connected transmission output shaft 212. Thus in the fourth speed range forward drive the hydrostatic drive unit 214 is operated to decrease the reverse speed of sun gear 229 to zero and then increase this sun gear's speed in the forward direction to maximum speed to continuously increase the speed of transmission output shaft 212. Downshifting from fourth to the third speed range forward drive is also provided with a speed synchronized condition at clutch 299 by the sun gear 237 and ring gear 241 which drive carrier 238 in the forward direction, this condition occurring at maximum forward motor output speed in the fourth speed range forward drive.

In the last half of the fourth speed range forward drive, sun gear 237 is rotating in the forward direction the same as ring gear 241 and these gears cooperatively provide a forward drive to carrier 238 to drive the driven member of clutch 302 in the forward direction which is the same direction that the drive member of this clutch is being driven by transmission input shaft 210 through gears 300 and 301. This arrangement enables the sizes of the operating gears to be selected so that a maximum reverse motor output speed the clutch 302 is speed synchronized.

A shift from fourth to a fifth speed range forward drive is preferably accomplished when the above speed synchronized condition of clutch 302 is reached. The clutch 302 is then engaged and then the clutch 292 is released. With clutch 302 engaged, mechanical drive is provided from the transmission input shaft 210 to drive carrier 238 in the forward direction. Since sun gear 237 is being driven in the forward direction, its speed component subtracts from that of carrier 238 in the drive they provide to ring gear 241 and connected transmission output shaft 212. Thus in the fifth speed range forward drive, the hydrostatic drive unit 214 is operated to decrease the forward speed of sun gear 237 to zero and then increase its speed to the maximum value in the reverse direction to continuously increase the forward speed of transmission output shaft 212. Downshifting from fifth to the fourth speed range forward drive is also provided with a speed synchronized condition at clutch 292 by sun gear 229 and carrier 231 which provide a forward drive to ring gear 234, this condition occurring at maximum reverse motor output speed in the fifth speed range forward drive.

The above described embodiments are illustrative of the invention which may be modified within the scope of the appended claims.

I claim:

1. A transmission comprising in combination an input shaft; an output shaft; a variable ratio hydrostatic drive unit having an input member driven by said input shaft and also having a variable speed output member; a first and a second planetary gear set each having a first and a second member and also having a third member whose speed is proportional to the speed differential of the first and the second member; means drivingly connecting the first member of both said gear sets to said variable speed output member; the third member of both said gear sets connected to said output shaft; means including first friction drive establishing means for selectively controlling the speed of the second member of one of said gear sets to establish a first speed range drive to said output shaft; drive train means including second friction drive establishing means and a gear train having a drive gear and a driven gear for selectively drivingly connecting said input shaft to drive the second member of the other gear set in one direction to establish a second speed range drive to said output shaft whereby on engagement of said first friction drive establishing means said first speed range drive is established and said second friction drive establishing means approaches a zero relative speed condition while output shaft speed increases as said variable speed output member increase in speed to a predetermined speed and whereby output shaft speed may be further increased by disengaging said first friction drive establishing means and engaging said second friction drive establishing means in a zero relative speed condition at said predetermned speed of said variable speed output member to establish said second speed range wherein output shaft speed increases as said variable speed output member decreases in speed; and drive train means including third friction drive establishing means and a gear train having a drive gear, an idler gear and a driven gear for selectively drivingly connecting said input shaft to drive the second member of said other gear set in the opposite direction to establish a third speed range drive to said output shaft whereby on engagement of said first friction drive establishing means said first speed range drive is established and said third friction drive establishing means approaches a zero relative speed condition as said variable speed output member approaches said predetermined speed and whereby output shaft speed may be further varied by disengaging said first friction drive establishing means and engaging said third friction drive establishing means in a zero relative speed condition at said predetermined speed of said variable speed output member to establish said third speed range dirve wherein output shaft speed varies with the speed of said variable speed output member.

2. A transmission comprising in combination an input shaft; an output shaft; a variable ratio hydrostatic drive unit having an input member driven by said input shaft and also having a variable speed output member; a first and a second planetary gear set each having a first and a second member and also having third member whose speed is proportionl to the speed differential of the first and the second member; the first member of both said gear sets drivingly connected to said variable speed output member; the third member of both said gear sets connected to said output shaft; means including friction drive establishing means for selectively controlling the speed of the second member of one of said gear sets to establish a drive to said output shaft; first drive train means including friction drive establishing means and a gear train having a drive gear and a driven gear for selectively drivingly connecting said input shaft to drive the second member of the other gear set in one direction to provide another drive to said output shaft; and second drive train means including friction drive establishing means and a gear train having a drive gear, an idler gear and a driven gear for selectively drivingly connecting said input shaft to drive the second member of said other gear set in a direction opposite said one direction to provide another drive to said output shaft.

3. The transmission set forth in claim 2 and third drive train means including friction drive establishing means and a gear train having a drive gear and a driven gear for selectively drivingly connecting said input shaft to drive the second member of said one gear set in said one direction to provide another drive to said output shaft.

4. The transmission set forth in claim 3 and fourth drive train means including friction drive establishing means and a gear train having a drive gear and a driven gear whose gear ratio is different than that of the gears in said first drive train means for selectively drivingly connecting said input shaft to drive the second member of said other gear set in said one direction to provide another drive to said output shaft.

5. A transmission comprising in combination an input shaft; an output shaft; a variable ratio hydrostatic drive unit having a pump driven by said input shaft and also having a motor; a first and a second planetary gear set each having a sun gear, a ring gear and a carrier carrying a pinion meshing with the sun gear and ring gear; both said sun gears drivingly connected to said motor; the carrier of said first gear set and the ring gear of said second gear set drivingly connected to said output shaft; a brake for braking the ring gear of said first gear set; driving train means including a clutch and a gear train having a drive gear and a driven gear for selectively drivingly connecting said input shaft to the carrier of said second gear set; and additional drive train means including a clutch and a gear train having a drive gear, an idler gear and a driven gear for selectively drivingly connecting said input shaft to the carrier of said second gear set.

6. A transmission comprising in combination an input shaft; an output shaft; a variable ratio hydrostatic drive unit having a pump driven by said input shaft and also having a motor; a first and a second planetary gear set each having a sun gear, a ring gear and a carrier carrying a pinion meshing with the sun gear and ring gear; means drivingly connecting both said sun gears to said motor; the ring gear of said first gear set and the carrier of said second gear set drivingly connected to said output shaft; first drive train means including a clutch and a gear train having a drive gear and a driven gear for selectively drivingly connecting said input shaft to the ring gear of said second gear set; second drive train means including a clutch and a gear train having a drive gear, an idler gear and a driven gear for selectively drivingly connecting said input shaft to the ring gear of said second gear set; third drive train means including a clutch and a gear train having a drive gear and a driven gear for selectively drivingly connecting said input shaft to the carrier of said first gear set; and fourth drive train means including a clutch and a gear train having a drive gear and a driven gear whose gear ratio is different than that of the gears in said third drive train means for selectively drivingly connecting said input shaft to the carrier of said first gear set.

7. A transmission comprising in combination an input shaft; an output shaft; a variable ratio hydrostatic drive unit having a pump driven by said input shaft and also having a motor; a first and a second planetary gear set each having a sun gear, a ring gear and a carrier carrying a pinion meshing with the sun gear and ring gear; means drivingly connecting both said sun gears to said motor; the carrier of said first gear set and the ring gear of said second gear set drivingly connected to said output shaft; first drive train means including a clutch and a gear train having a drive gear and a driven gear for selectively drivingly connecting said input shaft to the ring gear of said first gear set; second drive train means including a clutch and a gear train having a drive gear and a driven gear whose gear ratio is different than that of the gears in said first drive train means for selectively drivingly connecting said input shaft to the ring gear of said first gear set; third drive train means including a clutch and a gear train having a drive gear and a driven gear for selectively drivingly connecting said input shaft to the carrier of said second gear set; fourth drive train means including a clutch and a gear train having a drive gear and a driven gear whose gear ratio is different than that of the gears in said third drive train means for selectively drivingly connecting said input shaft to the carrier of said second gear set; and fifth drive train means including a clutch and a gear train having a drive gear, an idler gear and a driven gear for selectively drivingly connecting said input shaft to the carrier of said second gear set.

References Cited
UNITED STATES PATENTS

| 3,306,129 | 2/1967 | DeLalio | 74—687 |
| 3,492,891 | 2/1970 | Livezey | 74—720.5 |
| 3,503,278 | 3/1970 | Livezey | 74—720.5 |

CARLTON R. CROYLE, Primary Examiner

T. C. PERRY, Assistant Examiner

PO-1050
(5/69)

UNITED STATES PATENT OFFICE
CERTIFICATE OF CORRECTION

Patent No. 3,572,164      Dated March 23, 1971

Inventor(s) Marion D. Smith

It is certified that error appears in the above-identified patent and that said Letters Patent are hereby corrected as shown below:

Column 3, line 27, "ararngement" should read -- arrangement --. Column 4, line 31, "sped" should read -- speed --. Column 7, line 25, "driven" should read -- driv Column 10, line 19, "sahft" should read -- shaft --; line 5 "cooperativeliy" should read -- cooperatively --. Column 1 line 38, "continuousliy" should read -- continuously --. Column 12, line 70, after "range" insert -- drive --. Colu 13, line 13, "dirve" should read -- drive --; line 21, "proportionl" should read -- proportional --; line 65, "driving" should read -- drive --.

Signed and sealed this 10th day of August 1971.

(SEAL)
Attest:

EDWARD M. FLETCHER, JR.      WILLIAM E. SCHUYLER, JR.
Attesting Officer      Commissioner of Patents